United States Patent
Takehiko et al.

(10) Patent No.: US 6,741,795 B1
(45) Date of Patent: May 25, 2004

(54) DIGITAL VIDEO DISC PLAYER AND APPARATUS FOR DISPLAYING IMAGES

(75) Inventors: Okuyama Takehiko, Kanagawa-ken (JP); Yamada Hisashi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/362,330

(22) Filed: Jul. 28, 1999

(30) Foreign Application Priority Data

Oct. 22, 1998 (JP) .......................................... 10-301334

(51) Int. Cl.[7] ................................................ H04N 5/91
(52) U.S. Cl. ............................ 386/95; 386/98; 386/125
(58) Field of Search ......................... 386/33, 45, 95–96, 386/111–112, 125–126; 348/423.1; 725/131, 139, 151; 370/465, 503

(56) References Cited

U.S. PATENT DOCUMENTS

| | | | | |
|---|---|---|---|---|
| 6,134,383 A | * | 10/2000 | Kikuchi et al. | 386/111 |
| 6,137,539 A | * | 10/2000 | Lownes et al. | 725/139 |
| 6,172,989 B1 | * | 1/2001 | Yanagihara et al. | 370/473 |
| 6,211,800 B1 | * | 4/2001 | Yanagihara et al. | 341/50 |
| 6,272,153 B1 | * | 8/2001 | Huang et al. | 370/503 |
| 6,341,199 B1 | * | 1/2002 | Okada et al. | 386/126 |
| 6,370,322 B2 | * | 4/2002 | Horiguchi et al. | 386/95 |
| 6,393,196 B1 | * | 5/2002 | Yamane et al. | 386/111 |

FOREIGN PATENT DOCUMENTS

| | | |
|---|---|---|
| JP | 10051737 | 2/1998 |
| JP | 10154373 | 6/1998 |
| JP | 10190705 | 7/1998 |
| JP | 10334589 | 12/1998 |

* cited by examiner

*Primary Examiner*—Thai Tran
*Assistant Examiner*—Christopher Onuaku
(74) *Attorney, Agent, or Firm*—Pillsbury Winthrop LLP

(57) ABSTRACT

An apparatus for displaying images, such as a DVD player, outputs video signals, audio signals and sub-picture signals to a digital TV system in the form of digital signals. The PCM audio signals as decoded by means of the audio decoder 11 are converted into packets in the PCM/IEEE-1394 packet converter 27 after adjusting presentation timing matching by the presentation engine 17. The sub-picture signals as decoded by means of the sub-picture decoder 15 are also converted into packets in the IEEE-1394 packet converter 29 after adjusting presentation timing matching by the presentation engine 17. The video PES is converted into transfer streams by the MPEG-PS/TS converter 25 together with the system clock reference SCR and converted into packets in the IEEE-TS/1394 packet converter 31. The respective isochronous packets are transferred to a digital TV system through the 1394 link layer 33 and the physical layer 95.

27 Claims, 9 Drawing Sheets

DIGITAL VIDEO DISC PLAYER AND APPARATUS FOR DISPLAYING IMAGES

BACKGROUND OF THE INVENTION

1. Field of the Invention

The present invention is related to a digital video disc player for reproducing DVDs (Digital Versatile Discs) in which video signals, audio signals and sub-picture signals as encoded are written and outputting the digital signals, and to an apparatus for displaying images by receiving the digital signals from the digital video disc player.

2. Prior Art

In the recent years, digital television broadcasting systems and image storing mediums capable of making effective use of storage spaces with compression of the required bandwidth have been realized by making use of the digital compression encoding technique such as MPEG-2.

For example, in the field of the television broadcasting system, satellite transmitted digital television data has already been broadcast while terrestrial transmitted television data has been put in the planning stage. As the image storing medium, DVDs has come onto the market and have been expected as one of the effective image storing media for video products.

The currently available DVD players are provided with analog signal output ports for both images and sounds and sometimes also provided with digital PCM audio output ports. Also, the DVD players are connected to image reproduction systems functioning also as sound reproduction systems, such as televisions, by means of image signal transmission cables and a plurality of the audio signal transmission cables compatible with multiple audio channels.

FIG. 1 is a block diagram showing an exemplary configuration of a DVD player. In the same figure, the DVD player 101 is composed of a spindle motor 105 for turning a digital video disc 103, a pickup head 107, a head amplifier 109 equipped with an equalizer, a decoder/error correction circuit 111, a content scrambling system 113 for copy protecting DVD contents, a program stream demultiplexer (referred simply as the PS demultiplexer hereinbelow) 115, an audio stream decoder 117, a MPEG-2 image stream decoder 119, a sub-picture decoder 121, a navigation manager 123, a presentation engine 125, a menu data generation circuit 127, digital-analog converters 129 and 131 (called simply as D/A converter hereinbelow), a user interface 133 and an access control circuit 135.

Next, the operation of the DVD player 101 will be briefly explained. Laser light is emitted from the pickup head 107 in order to irradiate the digital video disc 103 with a predetermined wavelength. The reflected light is converted to an electric signal which is then output to the head amplifier 109. The head amplifier 109 serves to perform signal amplification, waveform shaping and digitization while the decoder/error correction circuit 111 serves to perform 8–16 decoding and error correction.

Next, the mutual authentication of the digital video disc 103 and the DVD player 101 is performed in order to confirm the authorization. When the authorization is successfully finished, the program stream PS as read from the digital video disc 103 is separated into sounds, videos, sub-pictures, navigation data in the form of packetized elementary streams (PES) by means of the PS demultiplexer 115.

The sound PES is decoded compatible with sound compression encoding technology such as AAC, AC3, MPEG and so forth by means of the audio stream decoder 117 in order to output PCM audio signals.

The video PES is video decoded by means of the MPEG-2 image stream decoder 119. The sub-picture PES is decoded by means of the sub-picture decoder 121. The navigation data PES is received by the navigation manager 123 for use in the reproduction control of the digital video disc 103.

The presentation engine 125 serves to synchronize sounds, videos and sub-pictures as decoded by the decoders 117, 119 and 121 respectively, and output video and sound PCM signals by encoding them in order to be compatible with a television encoding technique such as NTSC, PAL and so forth after overlaying sub-pictures on videos. The D/A converter 129 serves to convert the sounds PCM signals into analog audio signals and output the analog audio signals to an external device. On the other hand, the D/A converter 131 serves to convert the video PCM signals into analog video signals and output the analog video signals to an external device.

The menu data generation circuit 127 serves to generate a menu image and voice guidance for providing and supplying interface to the presentation engine 125 for allowing users to interact with the DVD player. The user interface 133 is provided with a console panel, a wireless controller and so forth in order to transfer user's operation of the digital video player to the navigation manager 123. The access control circuit 135 serves to select a title to be reproduced, a story of a multiple story title, fast-forwarding, pause, rewinding, and other specific manipulations to be performed.

The currently available the digital TV systems are sometimes provided with analog video input ports and analog audio input ports, but are not provided with a digital video input port.

FIG. 2 is a block diagram showing an exemplary configuration of a prior art digital TV system. In the same figure, the digital TV system 201 is provided with a BS antenna 203, a BS digital tuner 205, a decoder 207, an 8PSK/QPSK error correction circuit 209, a terrestrial antenna 211, a terrestrial digital tuner 213, an FFT error correction circuit 215, a decoder 217, a D/A converter 225, a loudspeaker 227, an NTSC encoder 229, a D/A converter 231 and a CRT 233.

The decoder 217 is provided with a TS processor 219, an audio decoder 221 and an MPEG-2 decoder/video signal processor 223.

Next, the operation of the digital TV system will be explained. Radio wave signals of 12 GHz as received by the BS antenna 203 is converted into intermediate frequencies, decoded and error corrected by means of the decoder 207 and the 8PSK/QPSK error correction circuit 209, and transferred to the decoder 217 in the form of the transport stream.

The VHF-band frequency signal as received by the terrestrial antenna 211 is passed through the terrestrial digital tuner 213 for selecting a channel, decoded and error corrected by means of the FFT error correction circuit 215, and transferred to the decoder 217 in the form of the transport stream.

The decoder 217 serves to select one of the transport streams as transferred from the 8PSK/QPSK error correction circuit 209 and the FFT error correction circuit 215 while sound, video and sub-picture streams are separated from the transport stream as selected by means of the TS processor 219. The audio decoder 221 serves to decode the audio stream into the corresponding PCM audio signals. The PCM audio signals are converted into analog signals by means of the D/A converter 225 and amplified by means of an amplifier (not shown in the figure) in order to output sounds from the loudspeaker 227.

The MPEG-2 decoder/video signal processor 223 serves to video decode the video stream, to sub-picture decode the sub-picture stream and to perform overlay of sub-pictures on the video image. The image signals obtained by overlaying sub-pictures on video images are converted into analog video signals through the NTSC encoder 229 and the D/A converter 231 in order to display moving pictures on the CRT 233.

However, in the case of the digital TV systems of this kind, no digital input port is provided because the specification of the ports for outputting digital images and, in particular, the specification of copyright protection does not have been standardized.

Furthermore, in the recent years, the IEEE-1394 technology has drawn attention of engineers as a multi-purpose digital interface for use in multimedia communications. The IEEE-1394 is a versatile, high-speed, and low-cost serial interface, providing plug-and-play ease of use by automatically configuring necessary control information when connecting peripheral devices with a cable. Furthermore, the IEEE-1394 provides data transfer capability at rates of 100 Mbit/s, 200 Mbit/s, and 400 Mbit/s including the asynchronous packet transfer modes and the isochronous packet transfer mode suitable for real-time data transfer for multimedia applications.

The isochronous packet transfer mode guarantees a fixed transfer speed (bandwidth), which has been assigned in advance for data transfer between two nodes, irrespective of existence of other data transfer channels at the same time. The time division data transfer is performed with the isochronous cycle of 125 $\mu$sec in the case of the IEEE-1394 technology. In order to synchronize the cycles of the respective nodes with each other, the clocks of the respective nodes are adjusted to the reference time, called as "absolute time". Then, the transfer speed is guaranteed by the packet transfer with the packet length proportional to the transfer speed as required of each isochronous transfer channel.

Furthermore, in the case of the IEEE-1394 technology, data is encoded in accordance with the secret (common) key cryptography or the public key cryptography for the purpose of protecting copyright. Namely, copy control information (CCI) is embedded in a digital content in order to indicate the copyright protecting of the digital content, i.e.: "no more copy allowed"; "only one generation allowed"; "completely inhibited"; and "freely allowed".

When the digital contents, for example, stored in a DVD and so on whose copy is inhibited are transferred, it is confirmed that a predetermined copyright protection system is installed in the device for receiving the digital contents in advance of transferring the digital contents as enciphered. In the case of the standardized specification which has been discussed and adopted in CPT-WG (Copy Protection Technical Working Group), the block to be enciphered is transferred at a maximum speed of 32 Mbits/sec (with 25 MHz system clock).

However, in the case that the prior art DVD player provided with an analog signal output port is connected to a television provided with an analog signal input port, it is troublesome to make correct connection of a number of cables with appropriate ports. Furthermore, the DVD player exchange analog signals with the television system so that the quality of signals tends to be degraded resulting in relatively poor images and sounds.

In order to improve the prior art analog interface, it has been contemplated to make use of a digital interface for connecting a DVD player and a television system. The IEEE-1394 technology, which may be a standard multimedia interface in future, is a promising digital interface also for this use.

Chained lines A to E as illustrated in FIG. 1 are plotted in order to indicate positions in which is provided a possible digital interface between the DVD player and a digital TV system when the analog outputting DVD player is provided with a digital output port. The chained line F is plotted in order to indicate positions in which is provided the analog interface between the DVD player and the digital TV system.

However, there are following shortcomings in the digital interfaces indicated by the chained lines A to E as illustrated in FIG. 1. In this case, it is assumed that the digital interface is implemented by means of the IEEE-1394 technology.

In the case that the digital interface is implemented on either of the chained lines A, B and C, substantial additional implementation of hardware and software is required for the television system in the same manner as required for the conventional DVD player.

Namely, the television system has to be provided with decoders for sounds, videos and sub-pictures. In other words, part of a DVD player has to be implemented within the television system. Particularly, it is a heavy burden for the television system, from the view point of the circuit scale as available, to provide audio decoders for all the sound compression encoding technologies such as AAC, AC3, MPEG and so forth.

Software processing for implementing the navigation function for the sub-pictures is a most complicated and difficult treatment as conducted in the DVD player and, therefore makes the burden placed upon software too heavy for a television system.

In the case that the digital interface is implemented on the chained line D, it is expedient that the television system need not audio decode and treat the navigation functions. However, also in this case, there is a shortcoming that sounds, videos and sub-pictures have to be processed in synchronism with each other.

In the case that the digital interface is implemented on the chained line E, there are following shortcomings. Namely, since the PCM video signal requires a wide band of 166 Mbit/sec which exceeds 32 Mbit/sec, i.e., the maximum band width of the ciphering ability of the IEEE-1394 technology, six equivalent cipher circuit have to be provided. This is not practicable so that it is difficult to copy protection from illegal copies.

SUMMARY OF THE INVENTION

The present invention has been made in order to solve the shortcomings as described above. It is an important object of the present invention to provide a digital video disc player and an apparatus for displaying images in which it is possible to establish the synchronization among the video signals, the audio signals, the sub-picture signals as transferred through the digital interface from the digital video disc player to the apparatus for displaying images.

It is another associated object of the present invention to provide a semiconductor device provided with a digital video disc player and an apparatus for displaying images in which it is possible to reduce the transmission band width of the digital interface between a digital video disc player and an apparatus for displaying images, and making it possible to effectively protect the copyright of digital contents without increasing the ciphering circuit suitable for the IEEE-1394 technology.

It is further associated object of the present invention to provide a semiconductor device provided with a digital video disc player and an apparatus for displaying images in which the navigation function is implemented only in the digital video disc player while the common MPEG2 image decoder is utilized in the apparatus for displaying images of both the video signals which are broadcasted or the video signals which are transmitted through the digital interface from a digital video disc player together with the audio signal and the sub-picture signals, so that a little burden is placed on software for make use of the digital interface.

It is further associated object of the present invention to provide a semiconductor device provided with a digital video disc player and an apparatus for displaying images in which the circuitry of the apparatus for displaying images of MPEG-2 is recognized as designed to support the IEC61883 standard for transmitting and receiving MPEG2 transport streams on a 1394 network.

In brief, the above and other objects and advantages of the present invention are provided by a new and improved semiconductor device provided with a digital video disc player for reading audio signals, video signals and sub-picture signals as compressed, encoded and multiplexed from a digital video disc, and outputting digital signals in accordance with a transmission format, comprising:
  a reference time counter for counting a reference time on the basis of which the video signals, the audio signals and the sub-picture signals are synchronized with each other; and
  a digital interface for outputting the video signals, the audio signals and the sub-picture signals in the form of the digital signals together with time information indicative of the reference time.

In accordance with another aspect of the present invention, a semiconductor device provided with an apparatus for displaying images comprising:
  a digital interface for receiving video signals, audio signals and sub-picture signals in the form of digital signals together with time information indicative of a reference time;
  a reference time counter for receiving the time information and counting the reference time on the basis of which the video signals, the audio signals and the sub-picture signals are presented in synchronization with each other; and
  a presentation circuit for presenting the video signals, the audio signals and the sub-picture signals in synchronization with each other on the basis of the reference time as counted by the reference time counter.

In accordance with a further aspect of the present invention, a semiconductor device provided with a digital video disc player for reading audio signals, video signals and sub-picture signals as compressed and encoded in accordance with the MPEG-2 technique from a digital video disc, and outputting digital signals in accordance with a transmission format, comprising:
  an STC counter for counting a reference time on the basis of which the video signals, the audio signals and the sub-picture signals are synchronized with each other for presentation;
  means for outputting the MPEG2-PES of the video signals as read from the digital video disc in the form of isochronous packets as compliance with a digital interface together with the reference time;
  a sub-picture decoder for decoding the sub-picture signals to generate on-screen data; and
  means for outputting the on-screen data in the form of isochronous packets as compliance with the digital interface in synchronism with the reference time.

Also, in accordance with a preferred embodiment of the present invention, the digital video disc player further comprises means for outputting the MPEG2-PES of the audio signals in the form of isochronous packets as compliance with the digital interface in synchronism with the reference time.

Furthermore, in accordance with a preferred embodiment of the present invention, the digital video disc player further comprises an audio decoder for generating the PCM audio signals of the audio signal as read; and means for outputting the PCM audio signals in the form of isochronous packets.

Furthermore, in accordance with a further preferred embodiment of the present invention, the MPEG2-PES is outputted as the isochronous packets with padding by the means for outputting the MPEG2-PES of the video signals as read in the form of isochronous packets.

Furthermore, in accordance with a further preferred embodiment of the present invention, the MPEG2-PES is converted into transport streams and outputted as the isochronous packets by the means for outputting the MPEG2-PES of the video signals as read in the form of isochronous packets as compliance with the digital interface together with the reference time.

Furthermore, in accordance with a further preferred embodiment of the present invention, when starting reproduction, the system clock reference contained in the program stream is detected packetized and outputted in accordance with a transmission format as compliance with the digital interface by the means for outputting the MPEG2-PES of the video signals as read in the form of isochronous packets as compliance with the digital interface together with the reference time.

In accordance with a further aspect of the present invention, a digital video disc player for reading audio signals, video signals and sub-picture signals as compressed and encoded in accordance with the MPEG-2 standard from a digital video disc, and outputting digital signals in accordance with a transmission format, comprising:
  an STC counter for counting a reference time on the basis of which the video signals, the audio signals and the sub-picture signals are synchronized with each other;
  a sub-picture decoder for decoding the sub-picture signals and generating on-screen data as synchronized with the video signals;
  an audio decoder for generating PCM audio signals from the audio signal as read;
  packetizing the MPEG2-PES of the audio signal as read, the PCM audio signals and the on-screen data in combination in accordance with a transmission format as compliance with the digital interface and outputting packets whose size is equivalent to that of the MPEG2-TS.

Furthermore, in accordance with a further preferred embodiment of the present invention, the MPEG2-PES is packetized as compliance with the digital interface while the system clock reference value is inserted in the isochronous header by the means for outputting the MPEG2-PES of the video signals as read in the form of isochronous packets as compliance with the digital interface.

In accordance with further aspect of the present invention, a digital video disc player for reading video signals as compressed and encoded from a digital video disc, and outputting digital signals in accordance with a transmission format, wherein a discontinuity flag is inserted into an isochronous packet as compliance with the digital interface to indicate discontinuity of a transfer stream when discontinuous reproduction operation is performed during a seamless moving image is reproduced.

In accordance with a further aspect of the present invention, an apparatus for displaying images comprising:

a digital interface for receiving video signals, audio signals and sub-picture signals in the form of digital signals together with a reference time to be loaded onto an STC counter;

a STC counter for counting the reference time on the basis of which the video signals, the audio signals and the sub-picture signals are presented in synchronization with each other; and means for loading the reference time as received onto the STC counter;

an MPEG-2 image decoder for decoding the video signals as received;

an presentation engine for synchronizing the video signals as decoded with reference to the STC counter;

means for overlaying the sub-picture signal on the video signals in synchronism with each other;

means for digital-to-analog converting the overlaid signals and displaying digital-to-analog converted signals; and means for outputting sounds on the basis of the audio signal as received.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DETAILED DESCRIPTION OF EMBODIMENTS

In the following explanation, an embodiment of the present invention will be explained in details with reference to figures.

Figure 3:
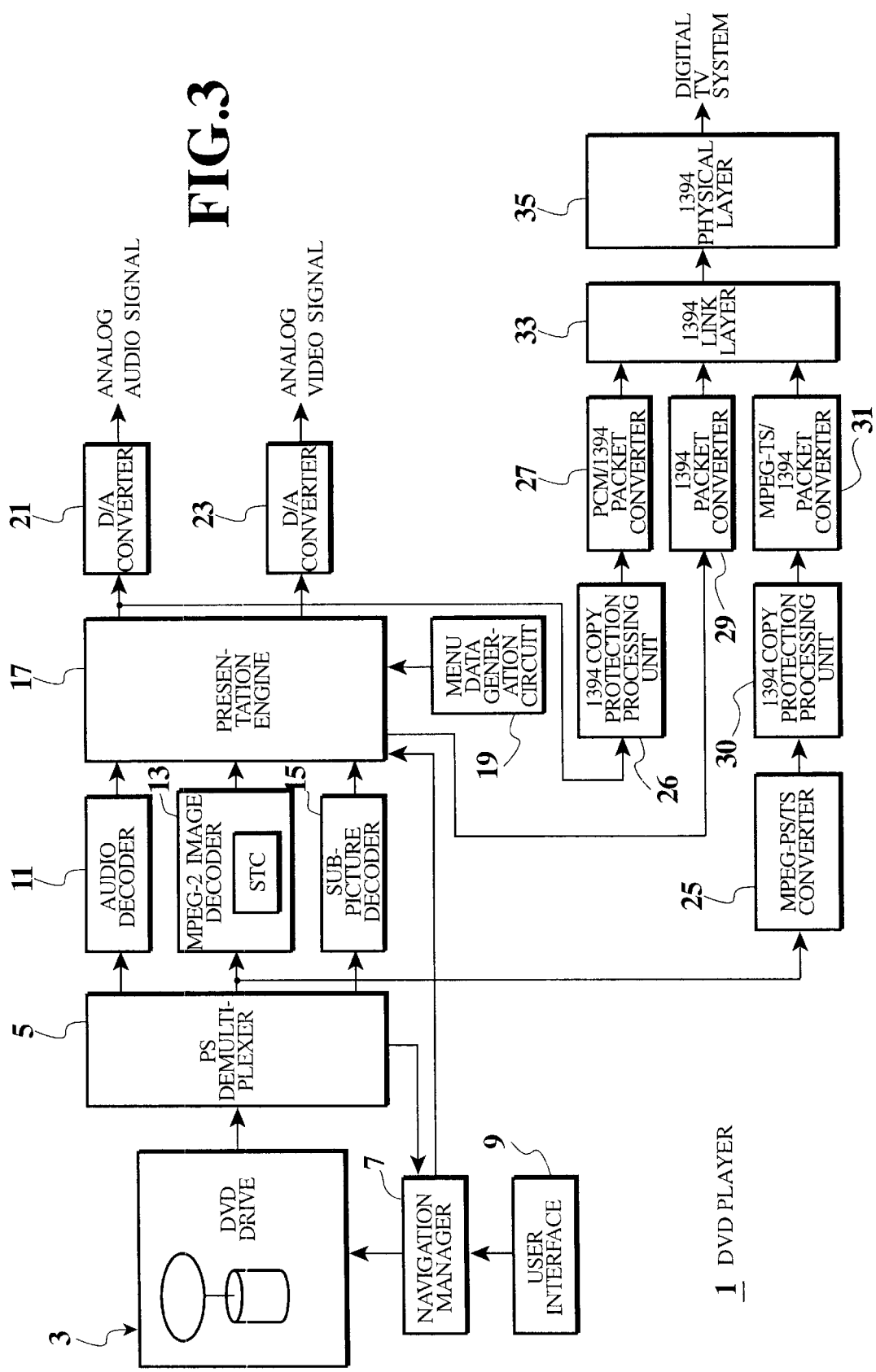
FIG. 3 is a block diagram showing the DVD player in accordance with the embodiment of the present invention.

FIG. 3 is a block diagram showing the DVD player in accordance with the embodiment of the present invention.

In the same figure, the DVD player 1 is composed of a DVD player 3, a PS demultiplexer 5, a navigation manager 7, a user interface 9, an audio decoder 11, an MPEG-2 image decoder 13, an STC (System Time Clock) counter 14 provided within the MPEG-2 image decoder 13, a sub-picture decoder 15, a presentation engine 17, a menu data generation circuit 19, D/A converters 21 and 23, an MPEG-PS/TS converter 25, 1394 copy protection processing units 26 and 30, a PCM/1394 packet converter 27, a 1394 packet converter 29, an MPEG-TS/1394 packet converter 31, a 1394 link layer 33 and the 1394 physical layer 35.

Next, the operation of the DVD player 1 will be explained.

Figure 1:
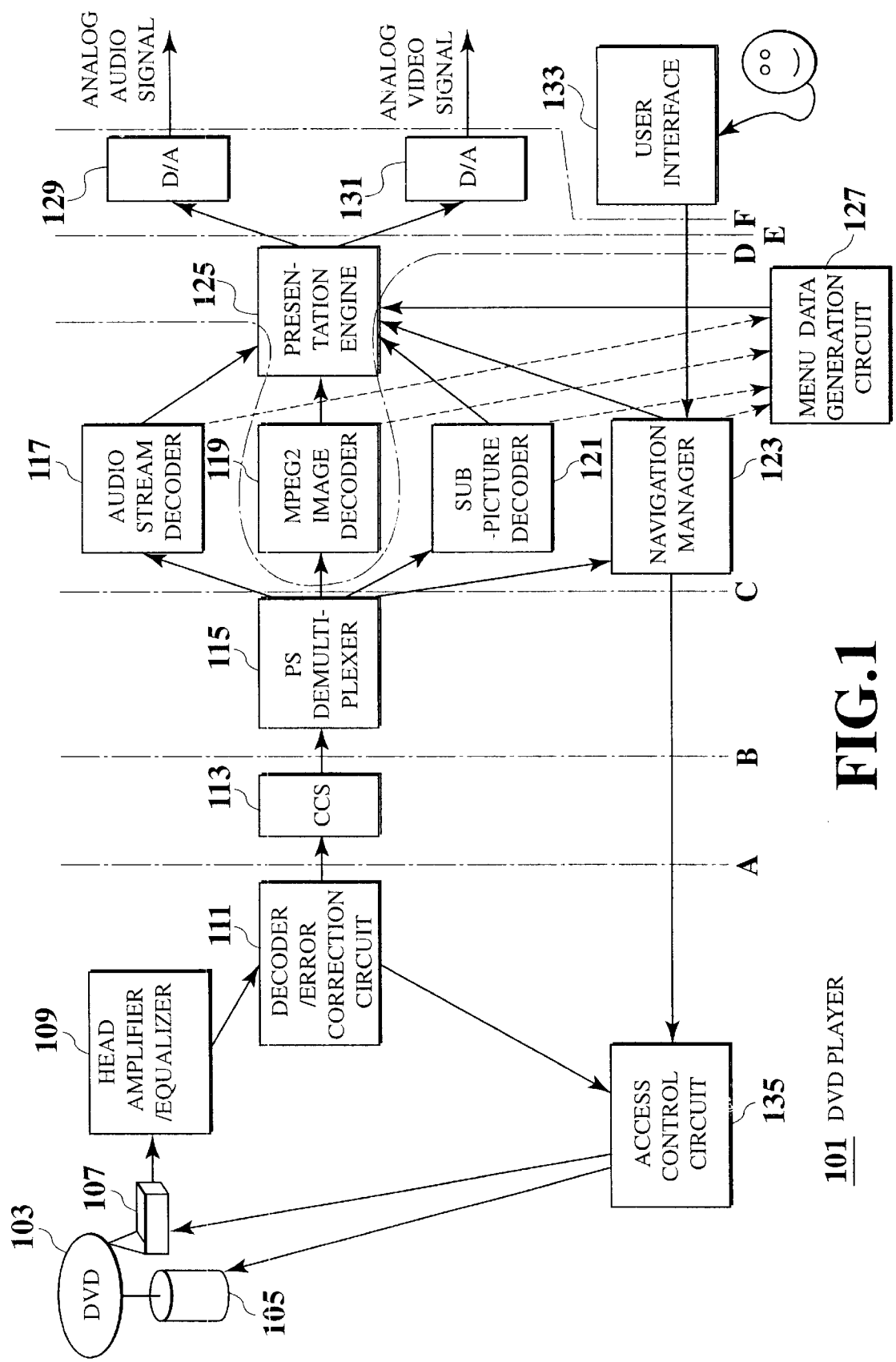
FIG. 1 is a block diagram showing an exemplary configuration of a DVD player.

The DVD player is composed of the spindle motor 105, the pickup head 107, the head amplifier/equalizer 109, the decoder/error correction circuit 111, the content scrambling system 113 for copy protecting DVD contents, and the access control circuit 135, and serves to output program streams as illustrated in FIG. 1.

In the case of reproducing a digital video disc or digital signals as broadcasted, video images of MPEG-2 are decoded by establishing timing match of the decode time stamp and the presentation time stamp with the reference time as counted by the STC counter 14, which is a built-in synchronization counter for display of the MPEG-2 image decoder 13.

The digital interface for video data is implemented corresponding to that positioned on the chained line C as illustrated in FIG. 1 in this case. Namely, the video signals of the MPEG-PES as separated from the program stream by means of the PS demultiplexer 5 is converted into a transport stream, copy protected, converted and outputted as 1394 packets. Namely, the MPEG-PES is converted into the transport stream by means of the MPEG-PS/TS converter 25, enciphered for copy protection by means of the 1394 copy protection processing unit 30, converted into 1394 isochronous packets by means of the MPEG-TS/1394 packet converter 31, and transferred to the digital TV system through the 1394 link layer 33 and the 1394 physical layer 35. At this time, the STC data is also transferred together with the CIP header of the isochronous packet as explained sapra in details with reference to FIG. 9.

The audio interface is implemented corresponding to that positioned on the chained line E as illustrated in FIG. 1 in this case. Namely, the audio signals as separated from the program stream by means of the PS demultiplexer 5 is decoded by the audio decoder 11, and synchronized by the presentation engine 17. The PCM audio signal as synchronized is then enciphered by the 1394 copy protection processing unit 26, packetized by the MPEG-TS/1394 packet converter 27, and transferred to the digital TV system through the 1394 link layer 33 and the 1394 physical layer 35. Meanwhile, the audio signals maybe outputted as encoded audio signals (MPEG-PES) in advance of decoding by the audio decoder 11, rather than as PCM audio signals.

The on-screen output data of the sub-pictures for overlays on the video images is converted into IEEE-1394 packets by means of the MPEG-TS/1394 packet converter 29 and transferred to the digital TV system through the 1394 link layer 33 and the 1394 physical layer 35.

Figure 4:
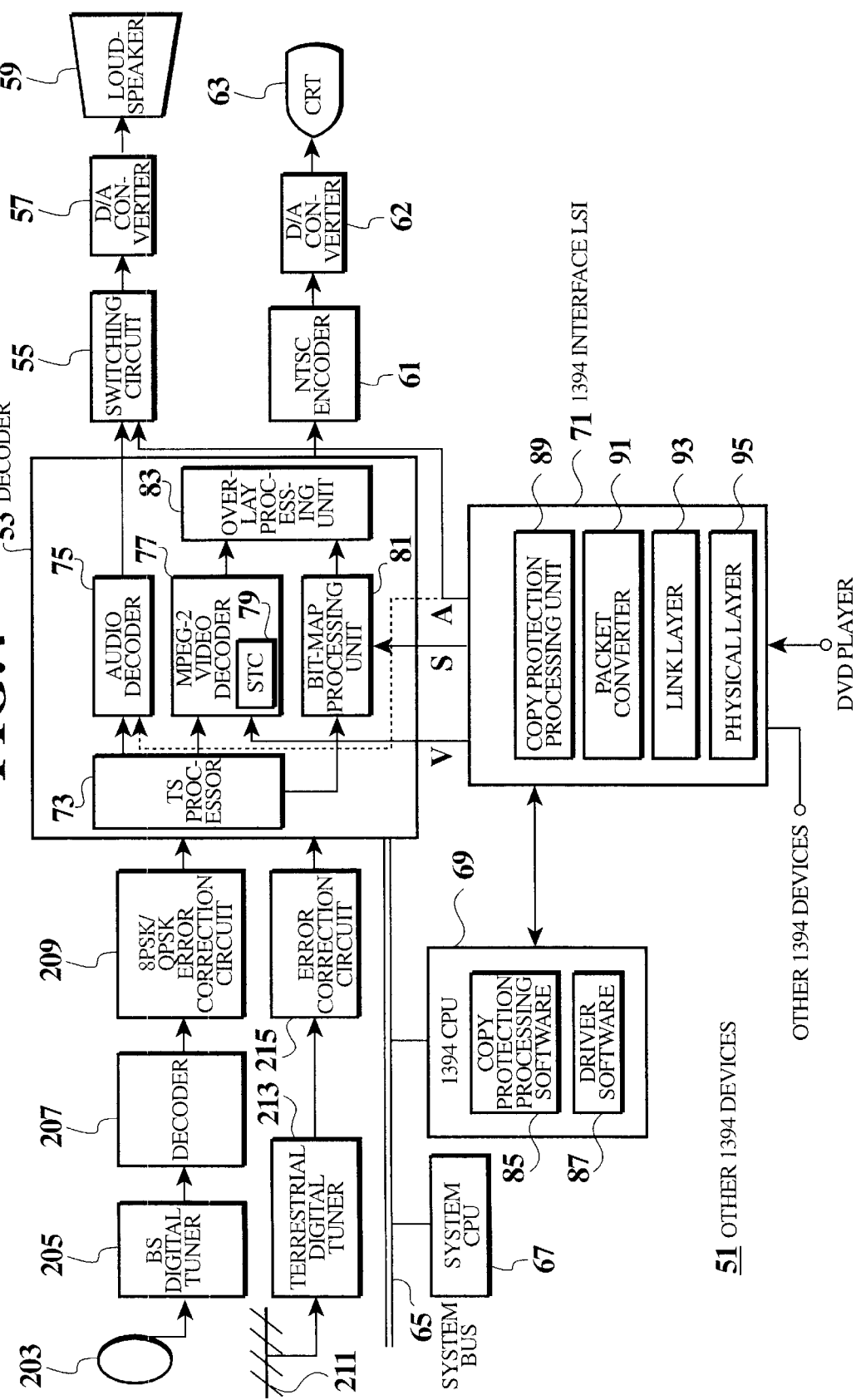
FIG. 4 is a block diagram showing the configuration of a digital TV system as an apparatus for displaying images in accordance with an embodiment of the present invention.

FIG. 4 is a block diagram showing the configuration of a digital TV system as an apparatus for displaying images in accordance with an embodiment of the present invention.

In the same figure, the digital TV system 51 is composed of a BS antenna 203, a BS digital tuner 205, a decoder 207, an 8PSK/QPSK error correction circuit 209, a terrestrial antenna 211, a terrestrial digital tuner 213, an FFT error correction circuit 215, a decoder 53, a switching circuit 55, a D/A converter 57, a loudspeaker 59, an NTSC encoder 61, a CRT 63, a system bus 65, the system CPU 67, a 1394 CPU 69 and a 1394 interface LSI 71.

The decoder 53 is composed of a TS processor 73 for separating sound, video and sub-picture streams from the transport stream as multiplexed, an audio decoder 75, an MPEG-2 image decoder 77 provided with a built-in STC counter 79, a bit-map processing unit 81 for bit-map processing the sub-pictures, an overlay processing unit 83 for overlaying the sub-pictures as treated by the bit-map processing unit 81 on the top of the video images as decoded by the MPEG-2 image decoder 77.

The 1394 CPU 69 is implemented with a program 85 for performing necessary copy protection operation to other IEEE-1394 ports and the 1394 driver program 87.

The 1394 interface LSI 71 is composed of a copy protection processing unit 89 provided for performing realtime ciphering operation and so on, an IEEE-1394 packet converter 91, a 1394 link layer 93 provided for separating the asynchronous packets from the isochronous packets of IEEE-1394 and controlling the operation cycle and transfer/reception of packets, and a 1394 physical layer 95 provided for converting encoded signals into external signals input/output through cables and vice versa and bus arbitration control.

Figure 2:
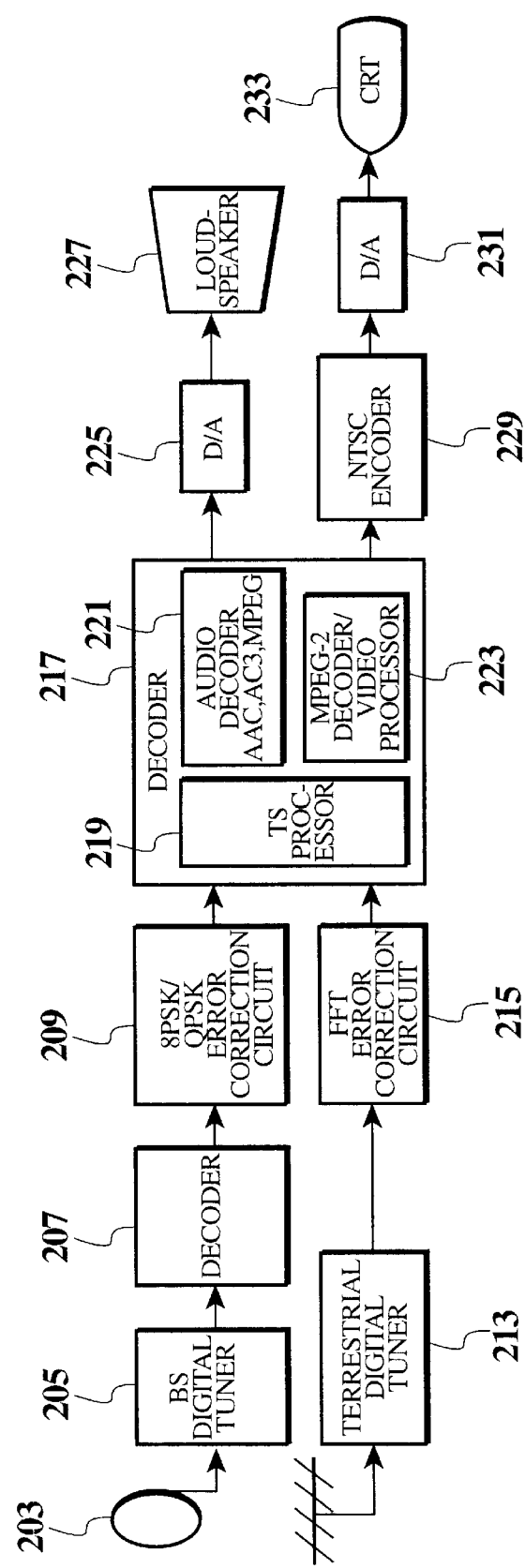
FIG. 2 is a block diagram showing an exemplary configuration of a prior art digital TV system.

Next, the operation of the digital TV system will be explained. The operation of the reception of the BS digital broadcasting signals and the terrestrial digital signals is similar as that of the prior art digital TV system as illustrated in FIG. 2, and therefore redundant explanation is dispensed with.

Next, the operation of the digital TV system 51 as illustrated in FIG. 4 for receiving and reproducing DVD contents, which have been reproduced by the DVD player as illustrated in FIG. 3 and transferred through the IEEE-1394 interface will be explained.

The isochronous packets as received by the 1394 interface LSI 71 are passed through the 1394 physical layer 95 and the 1394 link layer 93, separated into the sub-picture (S), the audio signal (A) and the video signals (V) as originally transmitted while conducting deciphering operation when needed.

The video signals (V) is input to and image decoded by the MPEG-2 image decoder 77 and output to the overlay processing unit 83.

The audio signal (A) is treated in two ways as explained in conjunction with FIG. 3, i.e., transferred in the form of the MPEG-PES before decoding and transferred in the form of the PCM audio signal after decoding. In the former case, the MPEG-PES audio signals are input to the audio decoder 75 for audio decoding. The switching circuit 55 selects the output of the audio decoder 75 and outputs it to the D/A converter 57 in this case. In the latter case, the MPEG-PES audio signals are input from the 1394 interface LSI 71 to the audio decoder 75 for audio decoding, and the PCM audio signal is selected by the switching circuit 55 and output to the D/A converter 57.

The sub-picture signals (S) are input to the bit-map processing unit 81 after MPEG decoding, bit-map processed and overlaid on the video signals by means of the overlay processing unit 83, followed by outputting video signals images after the overlaying process.

At this time, the synchronization in the MPEG-2 decoding is established in the digital TV system 51 after loading to the STC counter 79 the system clock reference (SCR) or the STC counter value contained in the CIP header of the isochronous packet of the video signals.

Namely, the digital contents are reproduced in the digital TV system as illustrated in FIG. 4, on the basis of the STC value as received through the IEEE-1394 cable and loaded onto the STC counter 14, with actual presentation timing which substantially coincides with the proper presentation timing, inside of the DVD player 1, as output from the D/A converters 21 and 23 in synchronism by the use of the reference time as counted by the STC counter 14 after the decoding operations of the audio decoder 11, the MPEG-2 image decoder 13 and the sub-picture decoder 15. The actual presentation timing may differs from the proper presentation timing due to the transmission delay of the IEEE-1394 cable, i.e., of the order of several hundreds of microseconds. However, such differences is negligible as the required synchronization among sounds, videos and sub-pictures.

Accordingly, since the bit-map data of the sub-pictures as decoded and output from the DVD player in synchronism with the video signals is transferred through the IEEE-1394 cable, the digital TV system can output complete video signals only by overlaying the sub-pictures on the video signals with no need for timing matching operation. This is the case of the synchronization between the video signals and the audio signals.

Meanwhile, in the case of MPEG2-PS in which isochronous packets are used with padding, the synchronization of the STC counter of the digital TV system with the STC counter of the DVD player is accomplished by detecting the system clock reference SCR contained in the program stream when starting reproduction, transferring the system clock reference value to the digital TV system through the IEEE-1394 cable with the CIP header.

On the other hand, in the case of MPEG2-TS, the synchronization of the STC counter of the digital TV system with the STC counter of the DVD player is accomplished by loading onto the STC counter 14 of the digital TV system the system clock reference SCR in the program stream PS, which has been transferred through the program clock reference PCR of the transfer stream.

Sounds, videos and sub-pictures are synchronized with in this manner for normal reproduction of the digital video disc.

In other reproduction modes such as reverse, fast-forwarding, pause, rewinding, reproduction while skipping frames and other specific manipulations, there occurs substantial error propagation in the digital TV system, due to the discontinuous stream, resulting in a subsequent elongated period in which decoding fails.

In order to solve this problem, in accordance with the present invention, a flag indicative of discontinuity is transmitted to the digital TV system from the DVD player. The digital TV system resets the MPEG-2 image decoder 13 by detecting the discontinuity in response to the discontinuity flag. The digital TV system halts decoding the discontinuous stream and resets the current decoding contexts, preventing error propagation, so that it becomes possible to quickly initiate the MPEG-2 image stream decoding anew. The period in which images are disturbed is shortened and inconspicuous.

Accordingly, the shortcomings can be eliminated by inserting the discontinuity flag, e.g., into the CIP header, in a specific reproduction mode.

Figure 5:
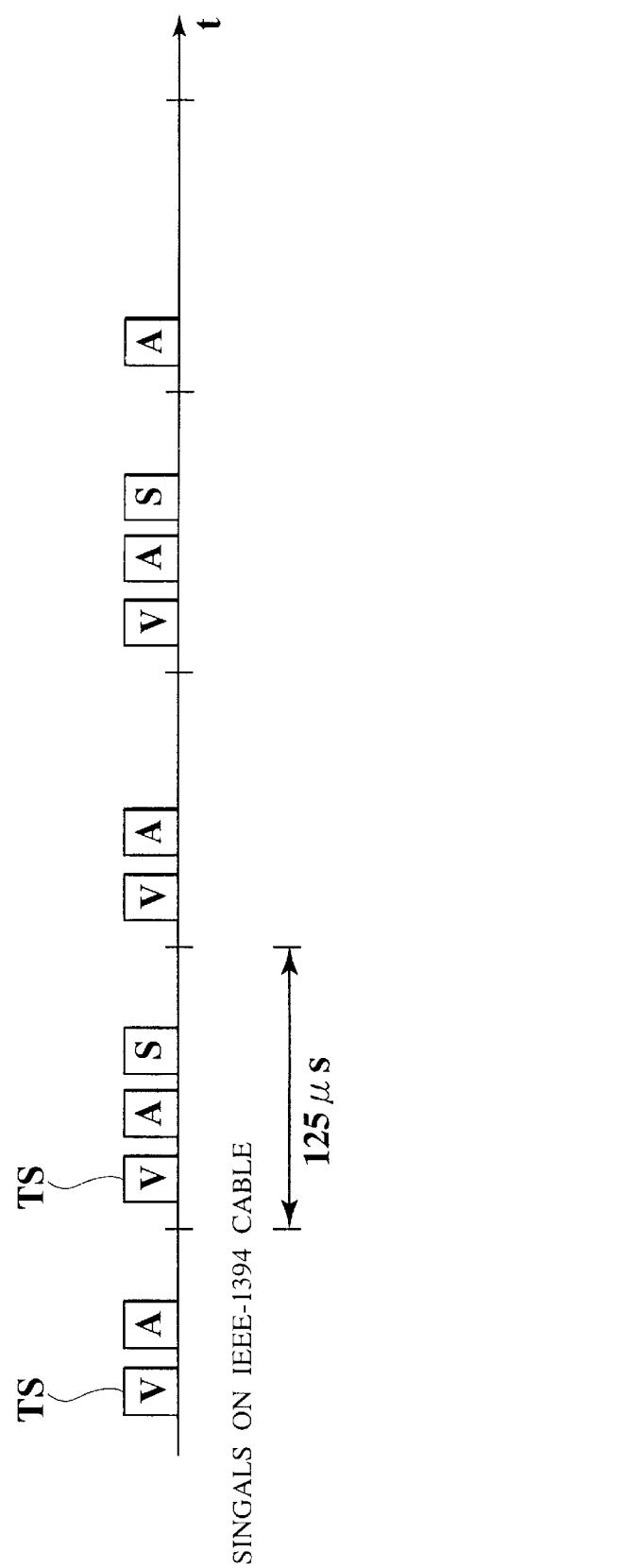
FIG. 5 is a schematic diagram showing the signal arrangement on the IEEE-1394 cable connecting the DVD player as illustrated in FIG. 3 and the digital TV system as illustrated in FIG. 4.

FIG. 5 is a schematic diagram showing the signal arrangement on the IEEE-1394 cable connecting the DVD player 1 as illustrated in FIG. 3 and the digital TV system 51 as illustrated in FIG. 4.

The DVD player 1 converts the video signals (V), the audio signals (A) and the sub-picture signals (S) into isochronous packets of IEEE-1394 respectively, and transferred to the IEEE-1394 cable in accordance with the isochronous cycle of 125 microseconds.

Figure 6:
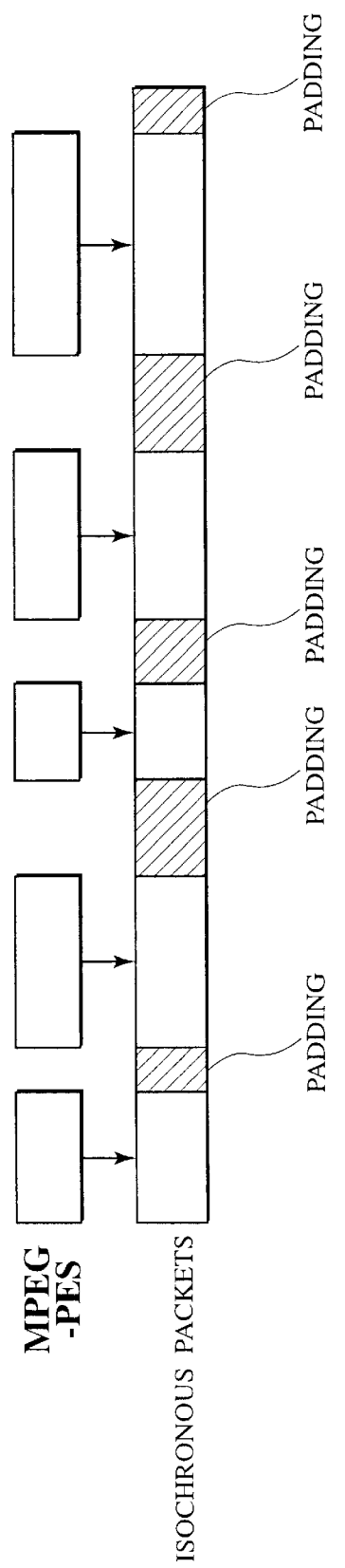
FIG. 6 is an explanatory view for explaining the conversion of the MPEG-PES into isochronous packets.

FIG. 6 is an explanatory view for explaining the conversion of the MPEG-PES into isochronous packets.

The MPEG-PES video signals contained in the program stream PS as read from the digital video disc are converted into isochronous packets, e.g., by inserting padding into the bursty MPEG-PES in order to form isochronous packets as illustrated in FIG. 6.

Figure 7:
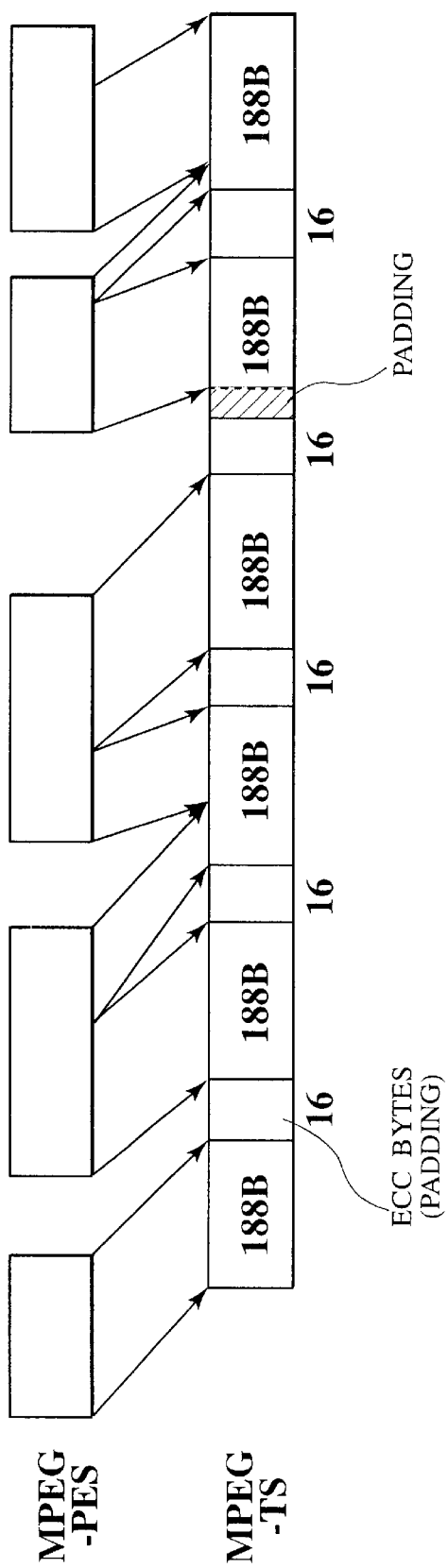
FIG. 7 is an explanatory view for explaining the conversion of the MPEG-PES into the MPEG-TS.

FIG. 7 is an explanatory view for explaining the conversion of the MPEG-PES into the MPEG-TS. Namely, when the variable-length MPEG-PES is converted into 188-byte fixed-length transfer stream, the variable-length MPEG-PES is separated into 188-byte sections to each of which an error correction code ECC of 16 bytes is inserted in order to obtain TS packets of 204 bytes. In this case, however, since no error correction is performed, the error correction code ECC of 16 bytes is simply recognized as padding.

Furthermore, in the case of 188-byte fixed-length transfer stream as illustrated in FIG. 7, the IEEE-1394 packet conversion protocol can be utilized without modification so that implementation of the equivalent procedure of the 1394 interface can be dispensed with, so that a little burden is placed on software for make use of the IEEE-1394 interface.

Figure 8:
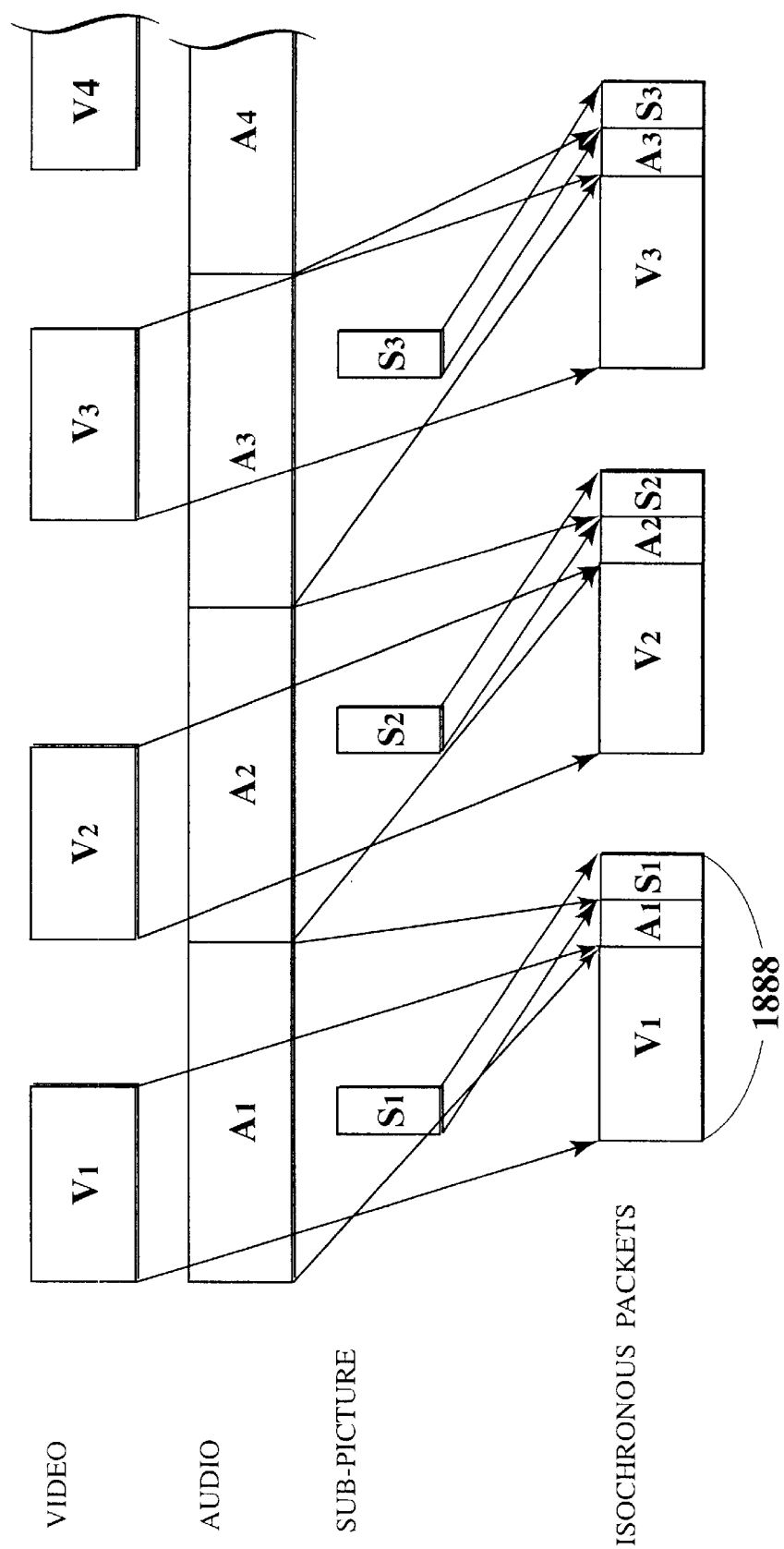
FIG. 8 is an explanatory view for explaining the conversion of the video signals, the audio signal and the sub-picture signals into isochronous packets.

FIG. 8 is an explanatory view for explaining the conversion of the video signals, the audio signal and the sub-picture signals into isochronous packets.

As illustrated in FIG. 8, the video signals, the audio signal and the sub-picture signals may be sequentially converted into isochronous packets of 188 bytes. Meanwhile, in the same figure, the audio signals are substantially compressed in the time axis because of the low bit rate thereof.

Figure 9:
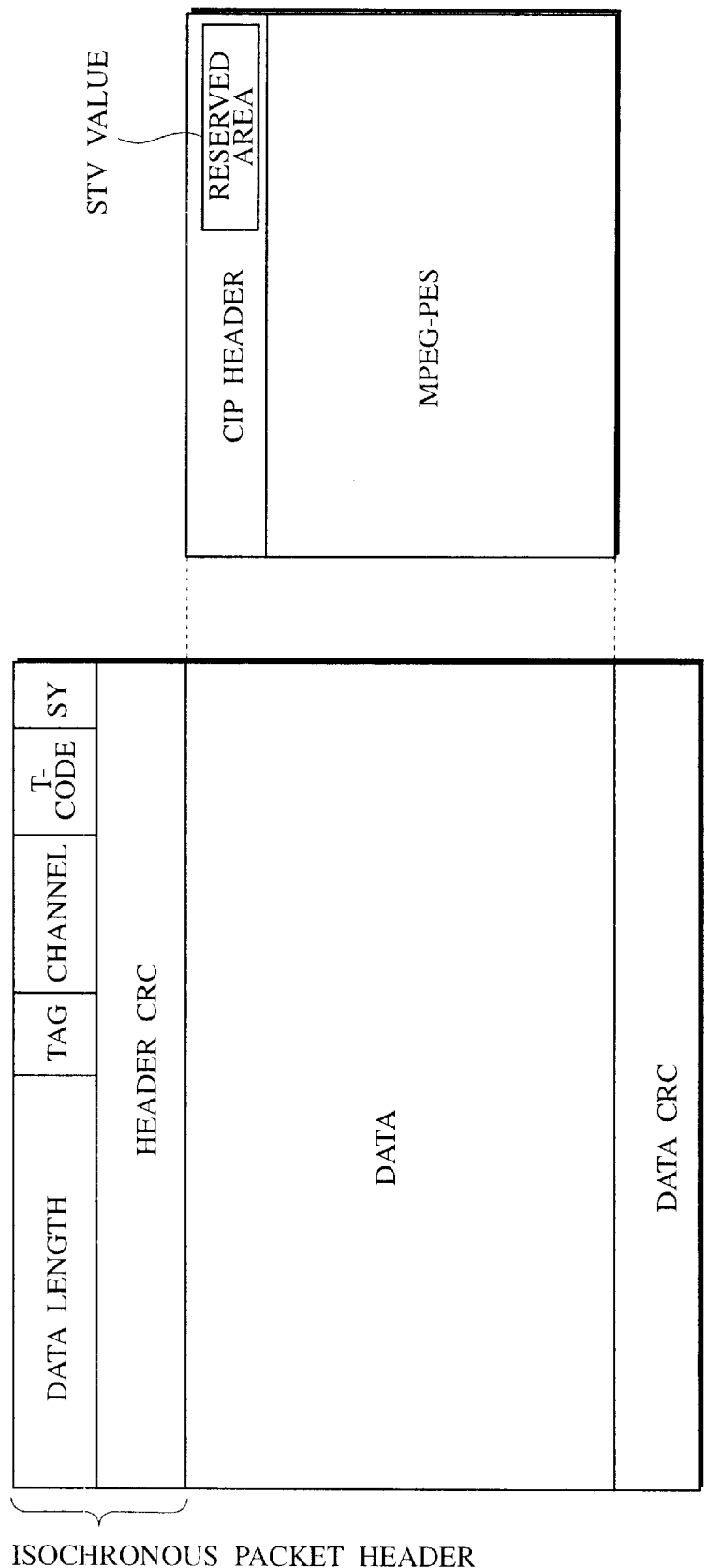
FIG. 9 is an explanatory view for explaining the isochronous packets of the IEEE-1394 technology and the STC value as inserted in the CIP header.

FIG. 9 is an explanatory view for explaining the isochronous packets of the IEEE-1394 technology and the STC value as inserted in the CIP header.

As illustrated the same figure, the isochronous packets of the IEEE-1394 is composed of the isochronous packet header provided with a cyclical redundancy code CRC thereof and the contents data also provided with a cyclical redundancy code CRC thereof. The isochronous packet header is composed of a structure comprising a data length, a tag indicative of the format of the isochronous packet, a channel, a T-code indicative of the type of the isochronous packet, a synchronization code Sy and the header CRC. Also, the contents data is composed of the CIP header located at the head thereof, and subsequent MPEG-PES data.

In this case, the CIP header is provided with a reserve area in which the system clock reference SCR or the value stored in the STC counter are inserted in order to transfer time reference information together with encoded video signals from the DVD player to the digital TV system.

The foregoing description of preferred embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated. For example, while the above described embodiment has been explained taking into consideration, as the suitable media for distributing digital contents, the digital versatile discs such as DVD-Video, DVD-ROM, DVD-RAM, DVD-RW, DVD-R and so forth, the present invention is applicable for other media and reproduction systems thereof such as other types of optical discs, magneto-optical discs, magnetic discs and other class of storage devices.

Also, while the digital interface is also not limited to the IEEE-1394 port in the above description, other types of digital interfaces can be used for the same purpose as long as realtime transfer is possible.

As explained above, in accordance with the present invention, it is possible to establish the synchronization among the video signals, the audio signals, the sub-picture signals as transferred through the digital interface from a digital video disc player to an apparatus for displaying images.

Furthermore, in accordance with the present invention, it is possible to reduce the transmission band width of the digital interface between a digital video disc player and an apparatus for displaying images, and making it possible to effectively protect the copyright of digital contents without increasing the ciphering circuit suitable for the IEEE-1394 technology.

Furthermore, in accordance with the present invention, the navigation function is implemented only in the digital video disc player while the common MPEG2 image decoder is utilized in the apparatus for displaying images of both the video signals which are broadcasted or the video signals which are transmitted through the digital interface from a digital video disc player together with the audio signal and the sub-picture signals, so that a little burden is placed on software for make use of the digital interface.

Furthermore, in accordance with the present invention, the circuitry of the apparatus for displaying images of MPEG-2 is recognized as designed to support the IEC61883 standard for transmitting and receiving MPEG2 transport streams on a 1394 network.

What is claimed is:

1. A digital video disc player, connectable to an apparatus for displaying images, for reading audio signals, video signals and sub-picture signals as MPEG compressed, and associated with each other to form digital content, encoded and multiplexed from a digital video disc, and outputting digital signals in accordance with a transmission format, comprising:

a sub-picture decoder for decoding the sub-picture signals;

a reference time generating circuit for generating a reference time with which the video signals as MPEG compressed and the sub-picture signals as decoded by the sub-picture decoder can be synchronized with each other for reproducing the content composed of the video signals, the audio signals and the sub-picture signals as associated at said apparatus for displaying images; and a digital interface for outputting the video signals as MPEG compressed, the audio signals and the sub-picture signals as decoded by the sub-picture decoder in the form of the digital signals together with the reference time to said apparatus for displaying images.

2. An apparatus for displaying images comprising:

a digital interface for receiving video signals as MPEG compressed and sub-picture signals as decoded in the form of digital signals together with reference time information indicative of a reference time;

a reference time counter device for receiving the reference time information and counting the reference time with which the video signals as MPEG compressed and the sub-picture signals as decoded can be synchronized with each other for reproducing the content composed of the video signals, the audio signals and the sub-picture signals as associated at said apparatus for displaying images, and a presentation circuit for presenting the video signals as MPEG compressed and the sub-picture signals as decoded in synchronization with each other on the reference time as counted by the reference time counter.

3. An apparatus for displaying images comprising:

a digital interface for receiving video signals as MPEG compressed and sub-picture signals as decoded in the form of digital signals together with a reference time to be loaded onto an System Time Clock (STC) counter;

an STC counter for counting the reference time with which the video signals as MPEG compressed and the sub-picture signals as decoded can be synchronized with each other for reproducing the content composed of the video signals, the audio signals and the sub-picture signals as associated at said apparatus for displaying images; and means for loading the reference time as received onto the STC counter;

an MPEG-2 image decoder for decoding the video signals as received;

an presentation engine for synchronizing the video signals as decoded with reference to the STC counter;

means for overlaying the sub-picture signal on the video signals in synchronism with each other.

4. A digital video disc player, connectable to an apparatus for displaying images, for reading audio signals, video signals and sub-picture signals as MPEG compressed, encoded and multiplexed from a digital video disc, and outputting digital signals in accordance with a transmission format, comprising:

a sub-picture decoder for decoding the sub-picture signals;

a reference time counting device, within a MPEG-2 decoding device, for generating a reference time with which the video signals as MPEG compressed and the sub-picture signals as decoded by the sub-picture decoder can be synchronized with each other; and a digital interface for outputting the video signals as MPEG compressed and the sub-picture signals as decoded by the sub-picture decoder in the form of the digital signals together with the reference time to said apparatus for displaying images.

5. The digital video disk player of claim 4, further including, means for outputting MPEG2-Packetized Elementary Streams (MPEG2-PES) of the video signals as read from the digital video disc in the form of isochronous packets as compliant with the digital interface together with the reference time, a sub-picture decoder for decoding the sub-picture signals to generate on-screen data, means for outputting the on-screen data in the form of isochronous packets as compliant with the digital interface in synchronism with the reference time.

6. The digital video disk player of claim 5, further including means for outputting the MPEG2-PES of the audio signals in the form of synchronism with the reference time.

7. An apparatus for displaying images comprising:

a digital interface for receiving video signals as MPEG compressed and sub-picture signals as decoded by the sub-picture decoder in the form of digital signals together with reference time information;

a reference time counting device, within a MPEG-2 decoding device, for receiving the reference time information and counting the reference time with which the video signals as MPEG compressed and the sub-picture signals as decoded by the sub-picture decoder can be synchronized with each other, and a presentation circuit for presenting the video signals as MPEG compressed and the sub-picture signals as decoded by the sub-picture decoder in synchronization with each other on the basis of the reference time as counted by the reference time counting device.

8. The apparatus of claim 7, wherein the presentation circuit includes an overlay processing unit for receiving the video signals and the sub-picture signals.

9. The apparatus of claim 8, further including an National Television Standards Committee (NTSC) encoder to receive output from the overlay processing unit and to output Cathode Ray Tube (CRT) compliant signals to a CRT.

10. A digital video disc system, comprising:

a sub-picture decoder for decoding sub-picture signals;

a Digital Versatile Disc (DVD) player reference time counting device, within a MPEG-2 decoding device, for generating a reference time with which video signals as MPEG compressed and the sub-picture signals as decoded by the sub-picture decoder can be synchronized with each other;

a transmitting digital interface for outputting the video signals, the audio signals and the sub-picture signals in the form of digital signals together with the reference time to said apparatus for displaying images;

a receiving digital interface for receiving the video signals as MPEG compressed and the sub-picture signals as decoded by the sub-picture decoder in the form of the digital signals together with the reference time;

a digital TV reference time counting device for receiving the reference time and counting a digital TV reference time based on the reference time with which the video signals as MPEG compressed and the sub-picture signals as decoded by the sub-picture decoder can be synchronized with each other; and a presentation circuit for presenting the video signals as MPEG compressed and the sub-picture signals as decoded by the sub-picture decoder in synchronization with each other on the basis of the digital TV reference time as counted by the reference time counting device.

11. The digital video disc system of claim 1, further including,
- a System Time Clock (STC) counter for counting the reference time; and
- means for outputting MPEG2-Packetized Elementary Streams (MPEG2-PES) of the video signals as read from the digital video disc in the form of isochronous packets as compliant with the digital interface along with the reference time.

12. The digital video disc player as claimed in claim 11 further comprising means for outputting the MPEG2-PES of the audio signals in the form of isochronous packets as compliance with the digital interface in synchronism with the reference time.

13. The digital video disc player as claimed in claim 11 further comprising an audio decoder for generating the PCM audio signals of the audio signal as read; and means for outputting the PCM audio signals in the form of isochronous packets.

14. The digital video disc player as claimed in claim 11 wherein the MPEG2-PES is outputted as the isochronous packets with padding by the means for outputting the MPEG2-PES of the video signals as read in the form of isochronous packets.

15. The digital video disc player as claimed in claim 14 wherein the MPEG2-PES is packetized as compliance with the digital interface while the system clock reference value is inserted in the isochronous header by the means for outputting the MPEG2-PES of the video signals as read in the form of isochronous packets as compliance with the digital interface.

16. The digital video disc player as claimed in claim 11 wherein the MPEG2-PES is converted into transport streams and outputted as the isochronous packets by the means for outputting the MPEG2-PES of the video signals as read in the form of isochronous packets as compliance with the digital interface together with the reference time.

17. The digital video disc player as claimed in claim 16 wherein, when starting reproduction, the system clock reference contained in the program stream is detected packetized and outputted in accordance with a transmission format as compliance with the digital interface by the means for outputting the MPEG2-PES of the video signals as read in the form of isochronous packets as compliance with the digital interface together with the reference time.

18. A digital video disc player for reading video signals as compressed and encoded from a digital video disk, and outputting digital signals in accordance with a transmission format, comprising:
- a disk drive for turning said digital video disc for reading said video signals therefrom; and
- a digital interface for outputting the video signals as MPEG encoded in the form of the digital signals,
- wherein a discontinuity flag is inserted into a Common Isochronous Packet (CIP) header of an isochronous packet as compliant with the digital interface when discontinuous reproduction operation is performed when a seamless moving image is reproduced.

19. The digital video disc player of claim 18, wherein an audio signal which is read from said digital video disc is output in a form of MPEG-PES.

20. The digital video disc player of claim 18, wherein a decoder includes an audio decoder for decoding an audio signal which is read from said digital video disc and for outputting said audio signal in a form of a PCM audio signal.

21. The digital video disc player of claim 18, further comprising a sub-picture decoder for decoding a sub-picture signal which is read from said digital video disc.

22. The digital video disc player of claim 18, further comprising a decoder for MPEG decoding said video signals, and an analog interface for outputting the video signals as decoded by said decoder.

23. A digital video disc player for reading video signals and sub-picture signals as compressed and encoded in accordance with the MPEG-2 technique from a digital video disc, and outputting digital signals in accordance with a transmission format, comprising:
- means for MPEG decoding sub-picture signals to generate on-screen data;
- a digital interface for outputting the video signals as MPEG encoded in the form of the digital signals;
- means for outputting a MPEG2-PES of the video signals as read from the digital video disc in a form of isochronous packets as compliance with the digital interface; and
- means for outputting the on-screen data in the form of the isochronous packets as compliance with the digital interface;
- wherein a discontinuity flag for indicating discontinuity of an MPEG Transport Stream is inserted into a Common Isochronous Packet (CIP) header of an isochronous packet as compliant with the digital interface when discontinuous reproduction operation is performed when a seamless moving image is reproduced.

24. The digital video disk player of claim 23, further comprising means for outputting MPEG2-PES of audio signals in form of isochronous packets as compliance with the digital interface.

25. The digital video disc player as claimed in claim 23, further comprising an audio decoder for generating PCM audio signals of an audio signal as read; and means for outputting the PCM audio signals in the form of the isochronous packets.

26. The digital video disc player of claim 23, wherein the MPEG2-PES is outputted as the isochronous packets with padding by the means for outputting the MPEG2-PES of the video signals as read in the form of isochronous packets.

27. The digital video disc player of claim 23, wherein the MPEG2-PES is converted into transport streams and outputted as the isochronous packets by the means for outputting the MPEG2-PES of the video signals as read in the form of isochronous packets as compliance with the digital interface together with a reference time.

* * * * *